US012185048B2

(12) United States Patent
Liao

(10) Patent No.: US 12,185,048 B2
(45) Date of Patent: Dec. 31, 2024

(54) EARPHONE CHARGER AND NECK-MOUNTED PORTABLE POWER SUPPLY

(71) Applicant: Shenzhen Huinn Innovation Technology Co., Ltd., Shenzhen (CN)

(72) Inventor: Tianyou Liao, Shenzhen (CN)

(73) Assignee: Shenzhen Huinn Innovation Technology Co., Ltd., Shenzhen (CN)

( * ) Notice: Subject to any disclaimer, the term of this patent is extended or adjusted under 35 U.S.C. 154(b) by 198 days.

(21) Appl. No.: 17/891,084

(22) Filed: Aug. 18, 2022

(65) Prior Publication Data

US 2022/0408174 A1 Dec. 22, 2022

Related U.S. Application Data

(63) Continuation of application No. PCT/CN2021/075920, filed on Feb. 8, 2021.

(30) Foreign Application Priority Data

Mar. 3, 2020 (CN) ......................... 202020245275.2
Mar. 3, 2022 (CN) ......................... 202020245283.7

(51) Int. Cl.
*H04R 1/10* (2006.01)

(52) U.S. Cl.
CPC ......... *H04R 1/1025* (2013.01); *H04R 1/1016* (2013.01)

(58) Field of Classification Search
CPC ...... H04R 1/1025; H04R 1/1016; H04R 1/02; H04R 5/033; H02J 7/0044
USPC ........................................................... 381/74
See application file for complete search history.

(56) References Cited

U.S. PATENT DOCUMENTS 10,701,472 B1 * 6/2020 Xu ........................ H02J 7/0044
2017/0094399 A1 * 3/2017 Chandramohan .... H04R 1/1025
2020/0204898 A1 * 6/2020 Schoeck ............. H04R 1/1016

FOREIGN PATENT DOCUMENTS

CN 209881432 * 12/2019
CN 209881432 U 12/2019

* cited by examiner

*Primary Examiner* — Norman Yu
(74) *Attorney, Agent, or Firm* — Hemisphere Law, PLLC; Zhigang Ma

(57) ABSTRACT

An earphone charger includes an earphone seat fixedly disposed with two charging resilient pieces for respectively abutting against positive and negative conductive strips of a BLUETOOTH earphone, and with an anti-disengagement component preventing the earphone from disengaging from the charging resilient pieces during charging. The charging resilient pieces extend obliquely thereby a distance therebetween gradually decreases along an insertion direction of the earphone. The charger can charge BLUETOOTH earphones of various generations and a working process is that: the earphone is moved to the earphone seat, the charging resilient pieces are deformed laterally under the pressing of the earphone, and then the positive and negative conductive strips abut against the two charging resilient pieces, and moreover, the earphone is tightly attached to the charging resilient pieces through the anti-disengagement component to achieve continuous charging. After the charging, the earphone is removed and the charging resilient pieces can rapidly rebound.

15 Claims, 6 Drawing Sheets

EARPHONE CHARGER AND NECK-MOUNTED PORTABLE POWER SUPPLY

CROSS-REFERENCE TO RELATED APPLICATIONS

This application is a continuation of international patent application No. PCT/CN2021/075920, filed on Feb. 8, 2021. The international patent application claims priority to a Chinese patent application No. 202020245275.2, filed on Mar. 3, 2020, entitled "EARPHONE CHARGER SUITABLE FOR VARIOUS GENERATIONS OF BLUETOOTH EARPHONES"; and claims priority to another Chinese patent application No. 202020245283.7, filed on Mar. 3, 2020, entitled "NECK-MOUNTED PORTABLE POWER SUPPLY WITH SPLIT-TYPE EARPHONE CHARGING WIRES". The entire contents of the above-mentioned applications are hereby incorporated herein by reference.

TECHNICAL FIELD

The disclosure relates to the technical field of earphone chargers and power supply devices, and more particularly to an earphone charger suitable for a BLUETOOTH earphone and a neck-mounted portable power supply.

BACKGROUND

Apple's wireless earphones are used together with an earphone box, the earphone box is mainly used for storage and power charging, and earphone chargers are disposed in the earphone box. A positive electrode conductive strip and a negative electrode conductive strip for power charging of the first and second-generations of earphones are arranged on a lower surface, while a positive electrode conductive strip and a negative electrode conductive strip for power charging of the third-generation of earphones are located on an outer round surface of a lower end. At present, the earphone charger can only meet a charging requirement of the first and second-generations of earphones, or can only meet a charging requirement of the third-generation of earphones, and thus has poor applicability.

SUMMARY

In view of the above shortcomings of the related art, the technical problem to be solved by the disclosure is to provide an earphone charger and a neck-mounted portable power supply adapted for various generations of BLUETOOTH earphones.

Specifically, in an aspect, the earphone charger according to an embodiment of the disclosure adapted for a BLUETOOTH earphone includes an earphone seat. The earphone seat is fixedly disposed with two charging resilient pieces for respectively abutting against the positive electrode conductive strip and the negative electrode conductive strip on a charging end of the BLUETOOTH earphone, the two charging resilient pieces are obliquely arranged in a manner of approaching towards each other along an insertion direction of the BLUETOOTH earphone relative to the earphone seat, and thereby a distance between the two charging resilient pieces gradually decreases along the insertion direction. The earphone seat is further fixedly disposed with an anti-disengagement component configured (i.e., structured and arranged) to prevent the BLUETOOTH earphone from disengaging from the two charging resilient pieces during charging.

In an embodiment of the disclosure, the earphone seat is further disposed with a resilient piece mounting block and a mounting groove for mounting the resilient piece mounting block. The resilient piece mounting block is located on a side where the distance between the two charging resilient pieces is smaller. The resilient piece mounting block is fixed with the earphone seat, and the resilient piece mounting block is fixedly disposed with two fixing pieces corresponding to the two charging resilient pieces in a one-to-one manner. Each of the charging resilient pieces includes a first end and a second end that are opposite to each other, each of the two fixing pieces is fixedly connected to the first end of a corresponding one of the two charging resilient pieces, and the second end is a free end.

In an embodiment of the disclosure, a first end of the earphone seat is fixedly disposed with the two charging resilient pieces, a second end opposite to the first end of the earphone seat is disposed with a wire-passing through slot, and the wire-passing through slot is configured to allow conductive wires to pass through and form electrical connections with the two charging resilient pieces.

In an embodiment of the disclosure, the earphone seat is further fixedly disposed with an anti-shifting resilient piece configured to prevent the BLUETOOTH earphone from side-shifting during the charging, and the anti-shifting resilient piece and the two charging resilient pieces are located on a same side of the resilient piece mounting block and are annularly distributed.

In an embodiment of the disclosure, the anti-disengagement component includes an annular elastic member having a hollow area, the annular elastic member is fixed to the earphone seat and matched with the charging end of the BLUETOOTH earphone, and the two charging resilient pieces are exposed in the hollow area.

In an embodiment of the disclosure, the earphone seat is disposed with an earphone insertion cavity configured to allow the charging end of the BLUETOOTH earphone to be inserted, a side wall of the earphone insertion cavity is disposed with two avoidance slots corresponding to the two charging resilient pieces in a one-to-one manner, and free ends of the two charging resilient pieces facing towards an opening of the earphone insertion cavity correspond to the two avoidance slots respectively.

In an embodiment of the disclosure, the anti-disengagement component includes an annular elastic member configured to surround a periphery of the BLUETOOTH earphone during the charging, the annular elastic member is fixed to the earphone seat and is located on a side of the two charging resilient pieces facing towards the opening of the earphone insertion cavity.

In an embodiment of the disclosure, the earphone seat is fixedly disposed with limiting posts, and two sides of the resilient piece mounting block abut against the limiting posts to prevent the charging resilient pieces mounted on the resilient piece mounting block from side-shifting during the charging.

In an embodiment of the disclosure, the anti-disengagement component is disposed with limit grooves configured to accommodate the limiting posts respectively, and the limiting posts are engaged with the limit grooves, to prevent the anti-disengagement component from side-shifting during the charging.

In an embodiment of the disclosure, the earphone seat is further fixedly disposed with an anti-shifting resilient piece configured to prevent the BLUETOOTH earphone from side-shifting during the charging, and the anti-shifting resilient piece and the two charging resilient pieces are triangularly distributed. The anti-disengagement component is further disposed with through grooves corresponding to the anti-shifting resilient piece and the two charging resilient pieces in a one-to-one manner, the through grooves are configured to allow the anti-shifting resilient piece and the two charging resilient pieces to pass through and expose the anti-shifting resilient piece and the two charging resilient pieces in a hollow area of the anti-disengagement component.

In another aspect, a neck-mounted portable power supply provided by an embodiment of the disclosure includes a neck-mounted member, two power supply boards respectively fixed at two opposite ends of the neck-mounted member, and two earphone charging cables corresponding to the two power supply boards in a one-to-one manner. One of the power supply board and the earphone charging cable paired therewith is fixedly disposed with a power supply interface at an end, and the other one of the power supply board and the earphone cable paired therewith is fixedly disposed with a plug corresponding to the power supply interface at an end. An end of each of the earphone charging cables facing away from the power supply board is fixedly disposed with the earphone charger according to any one of the preceding embodiments, and the two charging resilient pieces of the earphone charger are electrically connected to the earphone charging cable.

In an embodiment of the disclosure, the neck-mounted portable power supply further includes two sets of mounting casings respectively fixed at the two opposite ends of the neck-mounted member. Each of the power supply boards is arranged in corresponding one set of mounting casings of the two sets of mounting casings and fixed with the corresponding one set of mounting casings, the power supply interface and the plug are respectively disposed on the power supply board and the earphone charging cable, and each set of mounting casings are disposed with an opening configured to expose the power supply interface.

In an embodiment of the disclosure, the neck-mounted portable power supply further includes: a battery disposed in any one set of mounting casings of the two sets of mounting casings, and two sets of conductive wires corresponding to the two power supply boards in a one-to-one manner. One set of conductive wires of the two sets of conductive wires and the battery are disposed in same one set of mounting casings, and the other set of conductive wires of the two sets of conductive wires are embedded into the neck-mounted member. Each set of conductive wires of the two sets of conductive wires include a first conductive wire conducting a positive electrode of the battery with a positive electrode of the power supply board, and a second conductive wire conducting a negative electrode of the battery with a negative electrode of the power supply board. Each set of mounting casings of the two sets of mounting casings are disposed with a wire-passing through slot allowing the first conductive wire and the second conductive wire to pass through.

In an embodiment of the disclosure, lower ends of the two sets of mounting casings face are arranged opposite to each other, and the opening is located at an upper end of the each set of mounting casings.

In still another aspect, an earphone charger according to an embodiment of the disclosure includes: an earphone seat. The earphone seat is disposed with a resilient piece mounting block, a first charging resilient piece, a second charging resilient piece, an anti-shifting resilient piece, a mounting groove, and an annular elastic member. The first charging resilient piece and the second charging resilient piece are configured to respectively abut against a positive electrode conductive strip and a negative electrode conductive strip on a charging end of a BLUETOOTH earphone to charge the BLUETOOTH earphone, the first charging resilient piece and the second charging resilient piece are fixed on the resilient piece mounting block and spaced from each other, and the first charging resilient piece and the second charging resilient piece are obliquely arranged in a manner of approaching towards each other along an insertion direction of the BLUETOOTH earphone relative to the earphone seat. The anti-shifting resilient piece is configured to prevent the BLUETOOTH earphone from side-shifting during charging, and the anti-shifting resilient piece is fixed on the resilient piece mounting block and is located on a same side of the resilient piece mounting block as the first charging resilient piece and the second charging resilient piece. The resilient piece mounting block is installed in the mounting groove. The annular elastic member is fixed to the earphone seat and configured to allow the BLUETOOTH earphone to be extended therein to thereby make the positive electrode conductive strip and the negative electrode conductive strip on the charging end respectively abut against the first charging resilient piece and the second charging resilient piece for the charging, and the annular elastic member is further configured to prevent the BLUETOOTH earphone from disengaging from the first charging resilient piece and the second charging resilient piece during the charging.

In an embodiment of the disclosure, the resilient piece mounting block is disposed with fixing pieces corresponding to the first charging resilient piece and the second charging resilient piece in a one-to-one manner. Each of the first charging resilient piece and the second charging resilient piece includes a first end and a second end that are opposite to each other, the first end is fixedly connected to a corresponding one of the fixing pieces, and the second end is a free end.

In an embodiment of the disclosure, the second end is closer to the resilient piece mounting block than the first end.

In an embodiment of the disclosure, the anti-shifting resilient piece, the first charging resilient piece and the second charging resilient piece are spaced apart from each other and triangularly arranged.

In an embodiment of the disclosure, the annular elastic member includes a hollow rubber sleeve or an annular rubber strip.

In an embodiment of the disclosure, the earphone seat is disposed with an earphone insertion cavity configured to allow the charging end of the BLUETOOTH earphone to be inserted, a side wall of the earphone insertion cavity is disposed with avoidance slots corresponding to the first charging resilient piece and the second charging resilient piece in a one-to-one manner, and the free ends of the first charging resilient piece and the second charging resilient piece facing towards an opening of the earphone insertion cavity correspond to the avoidance slots respectively.

It can be seen from the above that the embodiments of the disclosure can achieve one or more of the following beneficial effects.

The earphone charger according to the embodiments of the disclosure may have the advantage of being capable of charging BLUETOOTH earphones of various generations. A specific working process may be as follows: the BLUETOOTH earphone is moved to the earphone seat, the charging resilient pieces are deformed laterally under the pressing of the BLUETOOTH earphone, and the positive and negative electrode conductive strips of the BLUETOOTH earphone respectively abut against the two charging resilient pieces. Meanwhile, with the help of the anti-disengagement component, the BLUETOOTH earphone can be ensured to be tightly attached to the charging resilient pieces during charging, so as to carry out continuous charging. After the charging is completed, the BLUETOOTH earphone is taken out, and the charging resilient pieces can rapidly rebound.

Moreover, for the first-generation or the second-generation BLUETOOTH earphone, the positive electrode conductive strip and the negative electrode conductive strip thereof are disposed on a lower surface of the earphone; and for the third-generation BLUETOOTH earphone, the positive and negative electrode conductive strips thereof are located on an outer round surface of a lower end of the earphone. Therefore, when the inserted BLUETOOTH earphone is the first-generation or the second-generation, a degree of being opened outwards of the two charging resilient pieces is relatively large; and when the inserted BLUETOOTH earphone is of the third-generation, a degree of being opened outwards of the two charging resilient pieces is relatively small. That is, a contact position between the first/second-generation BLUETOOTH earphone and the charging resilient pieces is lower than a contact position between the third-generation BLUETOOTH earphone and the charging resilient pieces. Therefore, through the adaptive adjustment of the degree of being opened outwards of the two charging resilient pieces, it can be adapted to various generations of BLUETOOTH earphones, and thus is convenient to use and has good applicability.

In addition, the neck-mounted portable power supply according to the embodiments of the disclosure may have advantages of convenient replacement and flexible use. Specifically, when it needs to replace the BLUETOOTH earphone with another BLUETOOTH earphone of the same type, the BLUETOOTH earphone can be directly taken out from the earphone charger, and when it needs to replace the earphone charging cable, the plug can be pulled out from the power supply interface. When a BLUETOOTH earphone is needed to be charged, the BLUETOOTH earphone is put into the earphone charger, the BLUETOOTH earphone then is conducted with the two charging resilient pieces, and meanwhile, through the anti-disengagement component, it is ensured that the BLUETOOTH earphone abuts against the charging resilient pieces to achieve continuous charging. Therefore, the neck-mounted portable power supply provided by the embodiments of the disclosure allows a user to charge the earphone while using the earphone. Moreover, the earphone charging cables of different colors or lengths can be quickly replaced, which is more flexible in use, and has low replacement cost and prolonged product service life.

BRIEF DESCRIPTION OF DRAWINGS

In order to more clearly illustrates technical solutions of embodiments of the disclosure, the following is a brief description of the drawings used for the illustrative embodiments of the disclosure. Apparently, the accompanying drawings in the following description are only some embodiments of the disclosure. For those skilled in the art, other drawings can be obtained based on these accompanying drawings without paying creative labor.

DETAILED DESCRIPTION OF EMBODIMENTS

In order to make purposes, technical solutions and advantages of embodiments of the disclosure clearer, the technical solutions in the illustrative embodiments of the disclosure will be described clearly and completely below with reference to the accompanying drawings. Apparently, the described embodiments are only some of embodiments of the disclosure, rather than all of embodiments of the disclosure. Based on the embodiments illustrated in the disclosure, all other embodiments obtained by those skilled in the art without paying creative labor fall within the protection scope of the disclosure.

It should be noted that all directional indications (such as up, down, left, right, front, rear, etc.) in the illustrative embodiments of the disclosure are only used to explain relative positional relationships and movements of various components under a certain specific posture (as shown in the accompanying drawings). If the specific posture changes, the directional indications will change accordingly.

In the disclosure, unless otherwise specified and defined, the terms "connected", "fixed" and the like shall be understood in a broad sense, for example, "fixed" can be fixed connection, detachable connection, or integrated; it may be a mechanical connection or an electrical connection; and it can be directly connected or indirectly connected through an intermediate medium. It can be a connection between two elements or an interaction between two elements, unless otherwise specified. For those skilled in the art, the specific meanings of the above terms in the disclosure can be understood according to specific circumstances.

In addition, references of "first", "second" and the like in the disclosure are for descriptive purposes only and are not to be construed as indicating or implying relative importance or implying quantity of the indicated features. Thus, the features defined as "first" and "second" may explicitly or implicitly include at least one of the features. In addition, the technical solutions of various illustrative embodiments may be combined with each other, but they must be based on what can be realized by those skilled in the art. When the combination of technical solutions is contradictory or impossible to realize, it shall be considered that the combination of such technical solutions does not exist and is not within the scope of protection claimed in the disclosure.

First Embodiment

Figure 1:
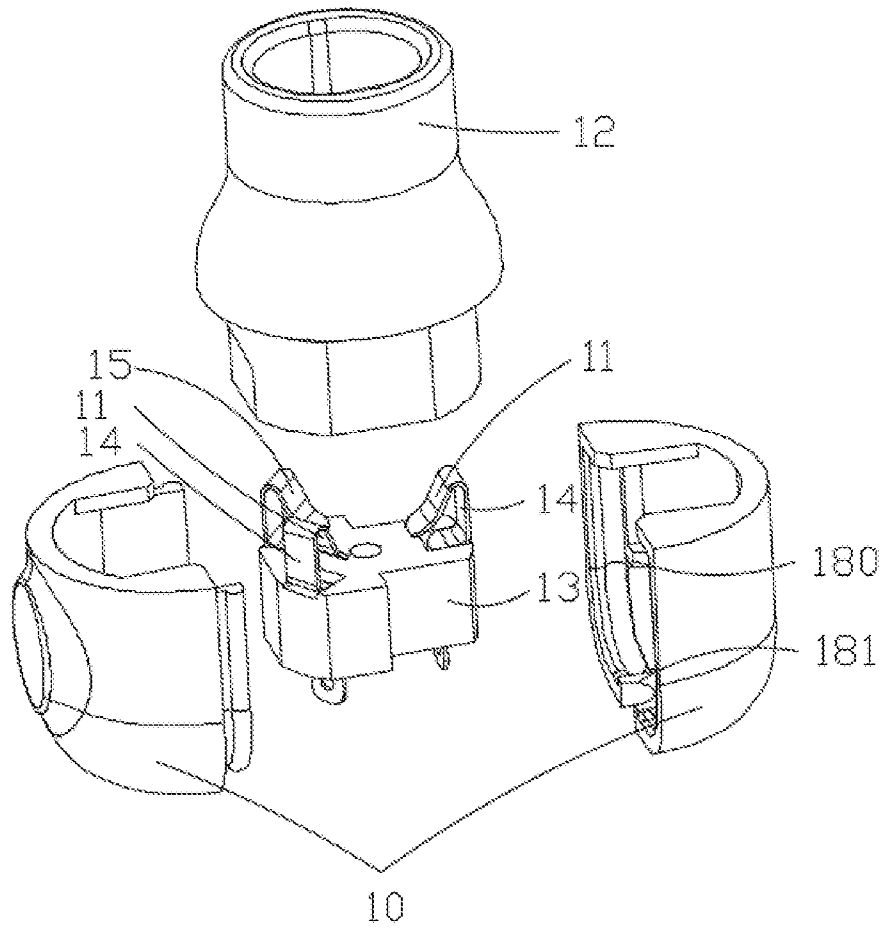
FIG. 1 is a schematic exploded structural view of an earphone charger adapted for various generations of BLUETOOTH earphones according to a first embodiment of the disclosure.
Figure 4:
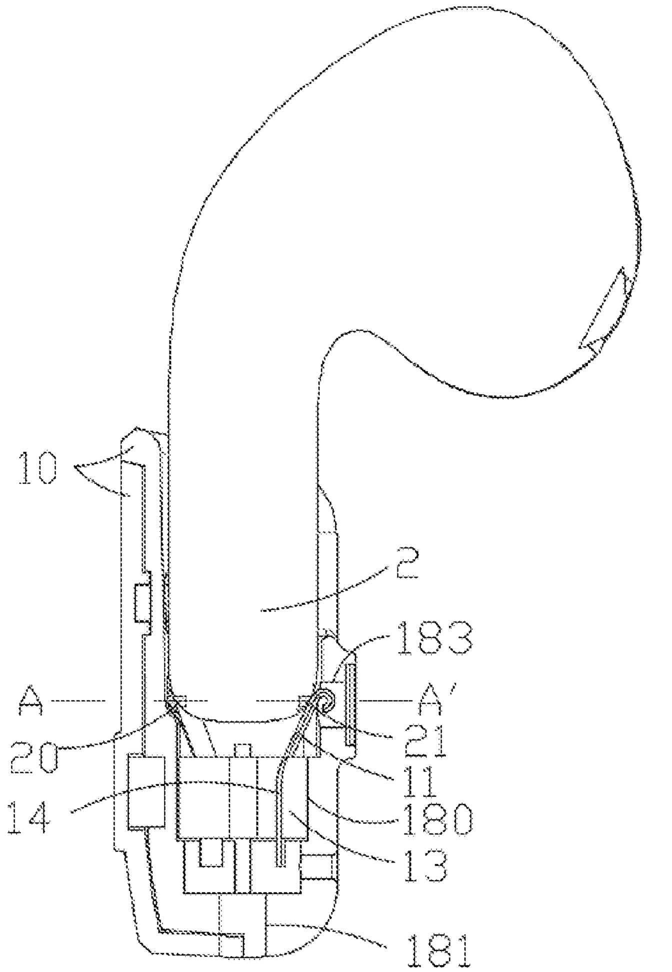
FIG. 4 is a schematic view of a used state of the earphone charger adapted for various generations of BLUETOOTH earphones according to the second embodiment of the disclosure (where the earphone charger is in a cross-sectional view, a broken line AA' represents a contact position between a third-generation earphone and charging resilient pieces).
Figure 5:
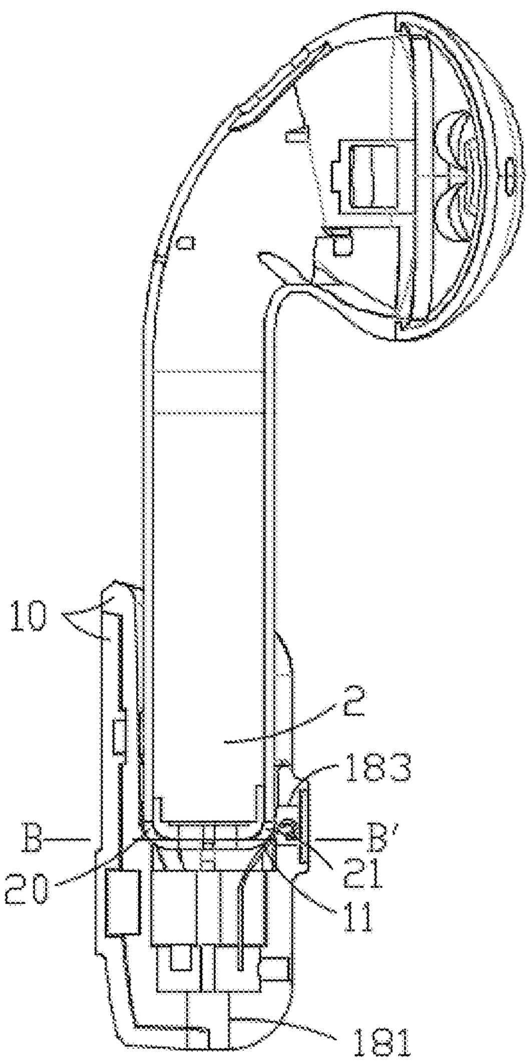
FIG. 5 is a schematic view of another used state of the earphone charger adapted for various generations of BLUETOOTH earphones according to the second embodiment of the disclosure (where the earphone charger is in a cross-sectional view, a broken line BB' represents a contact position between a first/second-generation earphone and the charging resilient pieces).

As shown in FIG. 1, an earphone charger adapted for various generations of BLUETOOTH earphones according to the first embodiment includes an earphone seat 10. The earphone seat 10 is fixedly disposed with two charging resilient pieces 11 for respectively abutting against a positive electrode conductive strip 20 and a negative electrode conductive strip 21 on a charging end of the BLUETOOTH earphone 2 (see FIGS. 4-5), and each of the charging resilient pieces 11 extends obliquely. A distance between the two charging resilient pieces 11 gradually decreases along an insertion direction (e.g., the direction as denoted by an arrow in FIG. 1) of the BLUETOOTH earphone 2. The earphone seat 10 is further fixedly disposed with an anti-disengagement component 12 used to prevent the BLUETOOTH earphone 2 from disengaging from the charging resilient pieces 11 during charging. The earphone charger of the embodiment has the advantage of being capable of charging BLUETOOTH earphones of various generations. A specific working process is as follows: the BLUETOOTH earphone 2 is moved to the earphone seat 10, the two charging resilient pieces 11 are deformed laterally under the pressing of the BLUETOOTH earphone 2, and the positive electrode conductive strip 20 and the negative electrode conductive strip 21 of the BLUETOOTH earphone 2 respectively abut against the two charging resilient pieces 11. Meanwhile, through the holding function of the anti-disengagement component 12 to the BLUETOOTH earphone, it can be ensured that the BLUETOOTH earphone is tightly attached to the charging resilient pieces 11 during the charging to thereby realize continuous charging. After the charging is completed, the BLUETOOTH earphone 2 is taken out, and the charging resilient pieces 11 can rapidly rebound.

For the first-generation or the second-generation BLUETOOTH earphone, the positive electrode conductive strip 20 and the negative electrode conductive strip 21 are disposed on a lower surface of the earphone; and for the third-generation BLUETOOTH earphone, the positive electrode conductive strip 20 and the negative electrode conductive strip 21 are located on an outer round surface of a lower end of the earphone. Therefore, when the inserted BLUETOOTH earphone 2 is the first-generation or the second-generation, a degree of being opened outwards of the two charging resilient pieces 11 is relatively large; and when the inserted BLUETOOTH earphone 2 is the third-generation, the degree of being opened outwards of the two charging resilient pieces 11 is relatively small. That is, a contact position between the first/second-generation BLUETOOTH earphone and the charging resilient pieces 11 is lower than a contact position between the third-generation BLUETOOTH earphone and the charging resilient pieces 11. In this situation, through the adaptive adjustment of the degree of being opened outwards of the two charging resilient pieces 11, it can be adapted to various generations of BLUETOOTH earphones, and thus is convenient to use and has good applicability.

In an embodiment, as shown in FIG. 1, the earphone seat 10 is further disposed with a resilient piece mounting block 13, and a mounting groove 180 for mounting the resilient piece mounting block 13. During mounting, the charging resilient pieces 11 are fixed to the resilient piece mounting block 13, and then the charging resilient pieces 11 and the resilient piece mounting block 13 together are put into the mounting groove 180 together, and thus it is convenient for mounting. The resilient piece mounting block 13 is located on a side where the distance between the two charging resilient pieces 11 is smaller, the resilient piece mounting block 13 is fixed to the earphone seat 10, and the resilient piece mounting block 13 is fixedly disposed with two fixing pieces 14 corresponding to the two charging resilient pieces 11 in a one-to-one manner. Each of the two fixing pieces 14 is fixed to an end of a corresponding one of the charging resilient pieces 11, and the fixing pieces 14 may be resilient pieces.

In an embodiment, as shown in FIG. 1, an end of the earphone seat 10 is fixedly disposed with the charging resilient pieces 11, and an opposite end thereof is disposed with a wire-passing through slot 181. The wire-passing through slot 181 is used to allow conductive wires to pass through and then form electrical connections with the charging resilient pieces 11, thereby conducting the charging resilient pieces 11 with an external power supply through the conductive wires.

In an embodiment, as shown in FIG. 1, the earphone seat 10 is further fixedly disposed with an anti-shifting resilient piece 15 used to prevent the BLUETOOTH earphone 2 from side-shifting during the charging. The anti-shifting resilient piece 15 and the two charging resilient pieces 11 are annularly distributed, so that the anti-shifting resilient piece 15 and the two charging resilient pieces 11 cooperate to position the BLUETOOTH earphone 2 during the charging. The three resilient pieces (i.e., the anti-shifting resilient piece 15 and the two charging resilient pieces 11) are triangularly arranged and are uniformly stressed, which is beneficial to the BLUETOOTH earphone 2 to tightly adhere to the charging resilient piece 11 to achieve continuous charging. It can also be seen from FIG. 1 that each of the charging resilient pieces 11 has a fixed end connected to a corresponding one of the two fixing pieces 14 and a free end away from the corresponding one of the two fixing pieces 14, and a distance between the free ends of the two charging resilient pieces 11 is smaller than a distance between the fixed ends of the two charging resilient pieces 11. In other words, the free ends are closer to the resilient piece mounting block 13 than the fixed ends. That is to say, the two charging resilient pieces 11 are disposed obliquely in a manner of approaching towards each other along the insertion direction of the BLUETOOTH earphone 2.

It is worth mentioning that, as shown in FIG. 1, the anti-disengagement component 12 includes a hollow rubber sleeve, that is, the anti-disengagement component 12 includes an annular elastic member having a hollow area. The hollow rubber sleeve is fixed to the earphone seat 10 and matched with the charging end of the BLUETOOTH earphone 2. The rubber sleeve is employed to limit the position of the BLUETOOTH earphone 2, so that the cost is low and the damage to the BLUETOOTH earphone 2 is small. Specifically, the hollow rubber sleeve may, for example, provide a downward friction force to the BLUETOOTH earphone 2 during the charging, and the two charging resilient pieces 11 and the anti-shifting resilient pieces 15 all are exposed to the hollow area of the anti-disengagement component 12.

Second Embodiment

The earphone charger adapted for various generations of BLUETOOTH earphone according to the second embodiment is shown in FIG. 2 to FIG. 5, the similarities with first embodiment will not be described again, and the differences are as follows.

As shown in FIGS. 2 to 5, the earphone seat 10 is disposed with an earphone insertion cavity 182 used to allow the charging end of the BLUETOOTH earphone 2 to be inserted. A side wall of the earphone insertion cavity 182 is disposed with two avoidance slots 183 corresponding to the two charging resilient pieces 11 in a one-to-one manner. The avoidance slots 183 respectively corresponds to ends (i.e., free ends) of the charging resilient pieces 11 facing towards an opening of the earphone insertion cavity 182 to avoid scratching the earphone seat 10.

Figure 2:
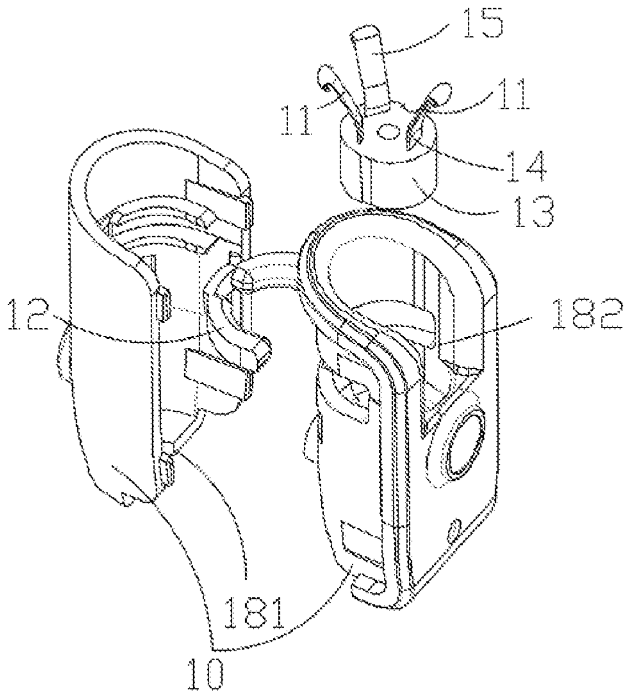
FIG. 2 is a schematic exploded structural view of an earphone charger adapted for various generations of BLUETOOTH earphones according to second embodiment of the disclosure.
Figure 3:
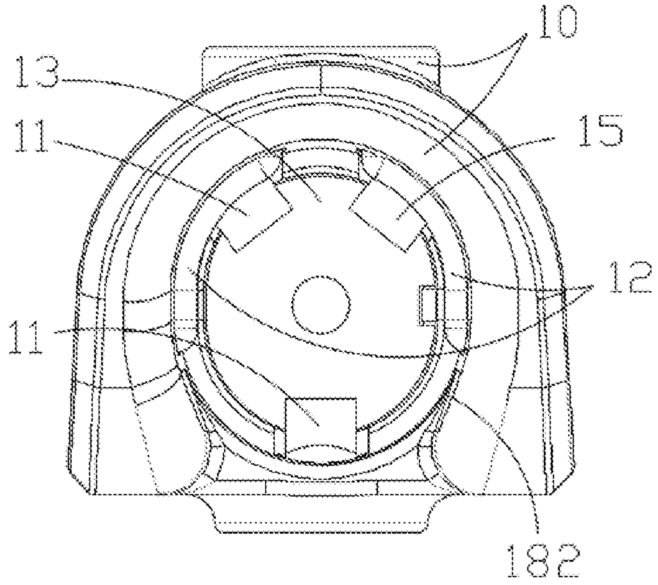
FIG. 3 is a schematic top view of the earphone charger adapted for various generations of BLUETOOTH earphones according to the second embodiment of the disclosure.

As shown in FIG. 2 and FIG. 3, the anti-disengagement component 12 includes an annular rubber strip used to surround a periphery of the BLUETOOTH earphone 2 during the charging, that is, the anti-disengagement component 12 includes an annular elastic member having a hollow area. The annular rubber strip is fixed to the earphone seat 10, and is located at a side of the charging resilient pieces 11 facing towards the opening of the earphone insertion cavity 182. The rubber strip is used for limiting, which is low in cost and does not scratch the BLUETOOTH earphone 2. In addition, as can be seen from FIG. 3, the two charging resilient pieces 11 and the anti-shifting resilient pieces 15 are exposed to the hollow area of the anti-disengagement component 12, and the two charging resilient pieces 11 are obliquely arranged in a manner of approaching towards each other along the insertion direction (e.g., the direction as denoted by an arrow in FIGS. 4-5) of the BLUETOOTH earphone 2.

Third Embodiment

Figure 6:
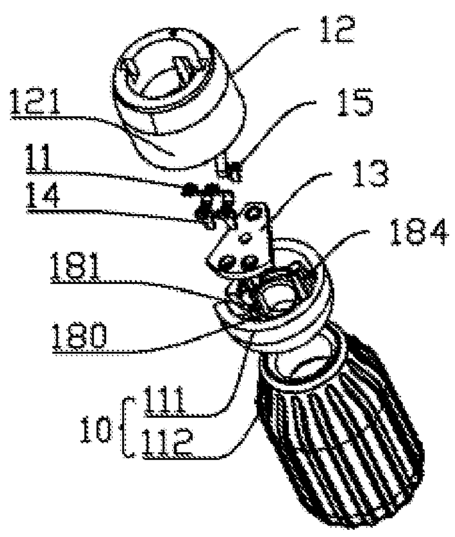
FIG. 6 is a schematic exploded structural view of an earphone charger adapted for various generations of BLUETOOTH earphones according to a third embodiment of the disclosure.
Figure 7:
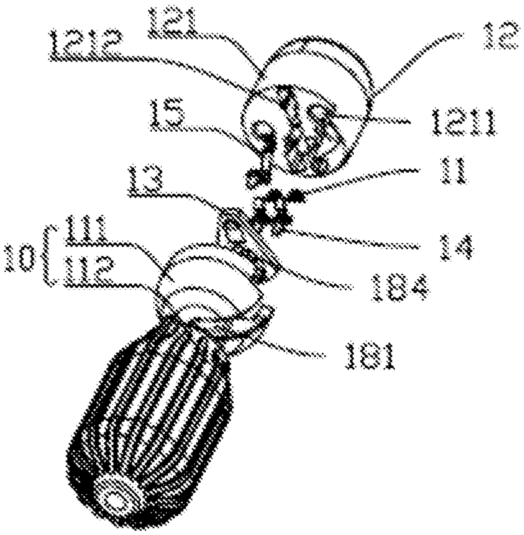
FIG. 7 is another schematic exploded structural view of the earphone charger adapted for various generations of BLUETOOTH earphones according to the third embodiment of the disclosure.
Figure 8:
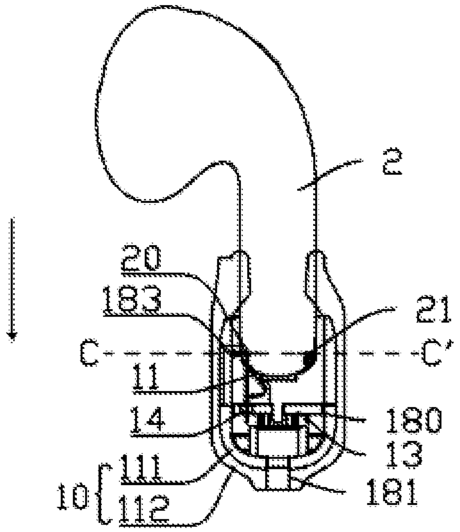
FIG. 8 is a schematic view of a used state of the earphone charger adapted for various generations of BLUETOOTH earphones according to the third embodiment of the disclosure (where the earphone charger is in a cross-sectional view, a broken line CC' represents a contact position between the third-generation earphone and charging resilient pieces).

The earphone charger adapted for various generations of BLUETOOTH earphone according to the third embodiment is shown in FIG. 6 to FIG. 8, the similarities with first embodiment will not be described again, and the differences are as follows.

As shown in FIG. 6 to FIG. 8, the earphone seat 10 is disposed with an earphone insertion cavity 182 used to allow the charging end of the BLUETOOTH earphone 2 to be inserted. A side wall of the earphone insertion cavity 182 is disposed with two avoidance slots 183 corresponding to the two charging resilient pieces 11 in a one-to-one manner. The avoidance slots 183 corresponds to ends (i.e., free end) of the charging resilient pieces 11 facing towards an opening of the earphone insertion cavity 182 to avoid scratching the earphone seat 10.

As shown in FIG. 6 and FIG. 7, the earphone seat 10 includes an earphone seat body 111 used to mount the resilient piece mounting block 13 and a protection casing 112 used to accommodate the earphone seat body. The protection casing 112 is used to accommodate the resilient piece mounting block 13 mounted on the earphone seat body 111, the anti-shifting resilient piece 15 and the charging resilient pieces 11 fixed on the resilient piece mounting block 13, and the anti-disengagement component 12. In addition, the BLUETOOTH earphones of various generations can be partially accommodated in the protection casing 112 of the earphone seat 10 during the charging. Under the protection of the protection casing 112, all components are compactly accommodated in the protection casing 112 to prevent the various generations of BLUETOOTH earphones from affecting charging due to the side-shifting of components during the charging. Moreover, the earphone seat body 111 of the earphone seat 10 is further fixedly disposed with limiting posts 184, and two sides of the resilient piece mounting block 13 abut against the limiting posts 184 to prevent the resilient piece mounting block 13 from side-shifting, thereby preventing the charging resilient pieces 11 mounted on the resilient piece mounting block 13 from side-shifting during the charging, and ensuring the stability of the charging of the BLUETOOTH earphone.

As shown in FIG. 6 and FIG. 7, the anti-disengagement component 12 includes a hollow rubber sleeve used to surround a periphery of the BLUETOOTH earphone 2 during the charging, that is, the anti-disengagement component 12 includes an annular elastic member having a hollow area. The anti-disengagement component 12 further includes a limit block connected to the hollow rubber sleeve, and the limit block 121 is disposed with through grooves 1212 corresponding to the anti-shifting piece 15 and the two charging resilient pieces 11 in a one-to-one manner. The through grooves 1212 are used to allow the anti-shifting resilient piece 15 and the two charging resilient pieces 11 to pass through and expose the anti-shifting resilient piece 15 and the two charging resilient pieces 11 in the hollow area of the anti-disengagement component 12.

In addition, the limit block 121 is further disposed with limit grooves 1211 for accommodating the limiting posts respectively, and the limiting posts 184 are engaged with the limit grooves 1211, to prevent the anti-disengagement component 12 from side-shifting during the charging.

In summary, in the embodiment of the disclosure, the earphone seat, the resilient piece mounting block and the anti-disengagement component are tightly connected and mutually limited by providing the limiting posts, the limit grooves, and the through grooves positioning the anti-shifting resilient piece and the charging resilient pieces, so as to ensure that the components will not be side-shifting during the charging for the BLUETOOTH earphone. On the basis of being adapted for the charging of the BLUETOOTH earphones of various generations, the stability of the BLUETOOTH earphone during the charging is further improved.

Fourth Embodiment

As shown in FIG. 9 to FIG. 12, the neck-mounted portable power supply with detachable (i.e., split-type) earphone charging cables provided by the fourth embodiment includes a neck-mounted member 30 with a head and a tail not connected, two power supply boards 31 respectively fixed at two ends of the neck-mounted member 30 (i.e., a head end and a tail end, or a first end and a second end), and two earphone charging cables 32 corresponding to the two power supply boards 31 in a one-to-one manner. One of the power supply board 31 and the earphone charging cable 32 paired therewith is fixedly disposed with a power supply interface 33 at one end, and the other one of the power supply board and the earphone charging cable paired therewith is fixedly disposed with a plug 34 corresponding to the power supply interface 33 at one end. An end of each of the earphone charging cables 32 facing away from the corresponding power supply board 31 paired therewith is fixedly disposed with an earphone charger 35. The earphone charger 35 is, for example, the earphone charger described in the second embodiment, the earphone seat 10 is disposed with the two charging resilient pieces 11 that cooperate to supply power to the BLUETOOTH earphone, and the anti-disengagement component 12 used to prevent the BLUETOOTH earphone from disengaging from the charging resilient pieces 11 during the charging. The two charging resilient pieces 11 are electrically connected to the earphone charging cable 32. The neck-mounted portable power supply of this embodiment has the advantages of convenient replacement and flexible use. Specifically, when it needs to replace the BLUETOOTH earphone with another BLUETOOTH earphone of the same type, the BLUETOOTH earphone can be directly taken out from the earphone charger 35; and when the earphone charging cable 32 needs to be replaced, the plug 34 can be pulled out from the power supply interface 33. When a BLUETOOTH earphone is needed to be charged, the BLUETOOTH earphone is put into the earphone charger 35, the BLUETOOTH earphone then is conducted with the two charging resilient pieces 11, and meanwhile, through the anti-disengagement component 12, it is ensured that the BLUETOOTH earphone abuts against the charging resilient pieces 11 to achieve continuous charging. Therefore, compared with the neck-mounted BLUETOOTH earphone that integrates the BLUETOOTH earphone and a power supply, one end of the earphone charging cable is fixed to the BLUETOOTH earphone and the other end is fixed to the power supply board on a collar, the user cannot quickly replace the earphone charging cable or the BLUETOOTH earphone according to actual needs, which is inconvenient to use; while the neck-mounted portable power supply of the fourth embodiment allows a user to charge the earphone while using the earphone. In addition, the user can quickly change the earphone charging cable of different colors or lengths, which is more flexible in use, and has low replacement cost and prolonged product service life.

Among them, the neck-mounted member 30 may be made of hard plastic or rubber, and the plug 34 may be a universal serial bus (USB) plug or a TYPE-C plug.

Figure 9:
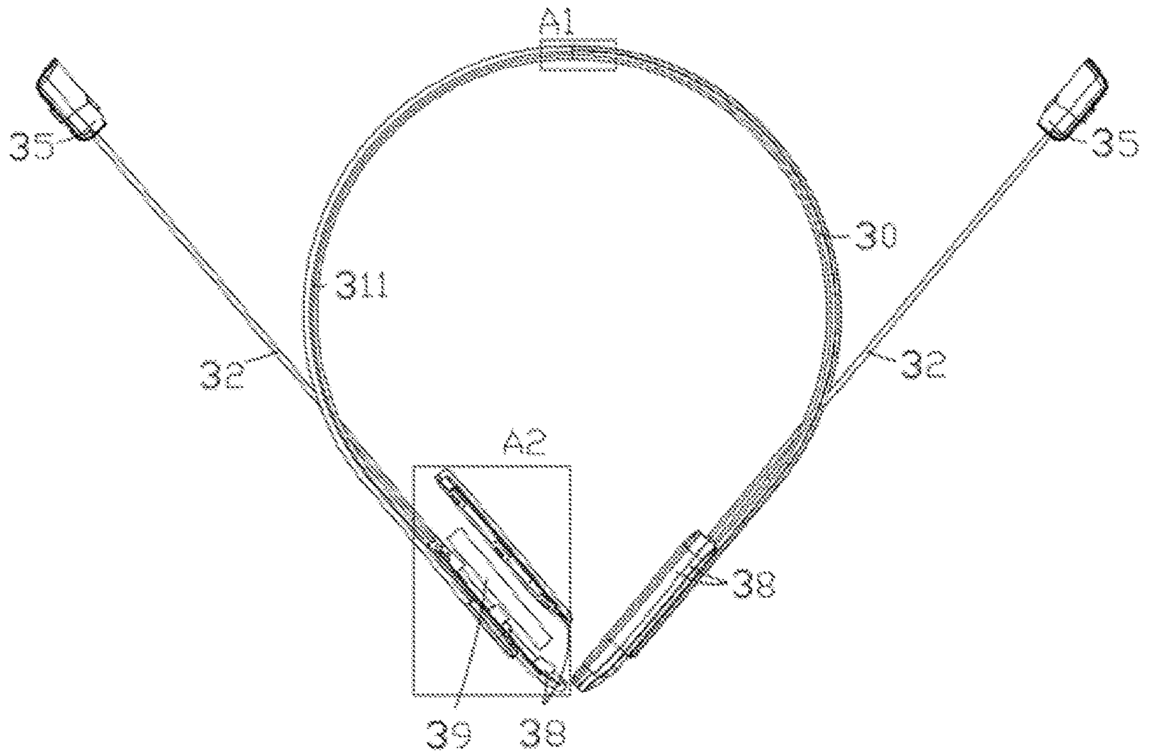
FIG. 9 is a schematic exploded structural view of a neck-mounted portable power supply with detachable (i.e., split-type) earphone charging cables according to a fourth embodiment of the disclosure (where one set of mounting casings on the left side is in a half sectional view, and one conductive wire inside is hidden, and a neck-mounted member is also in a half sectional view).
Figure 12:
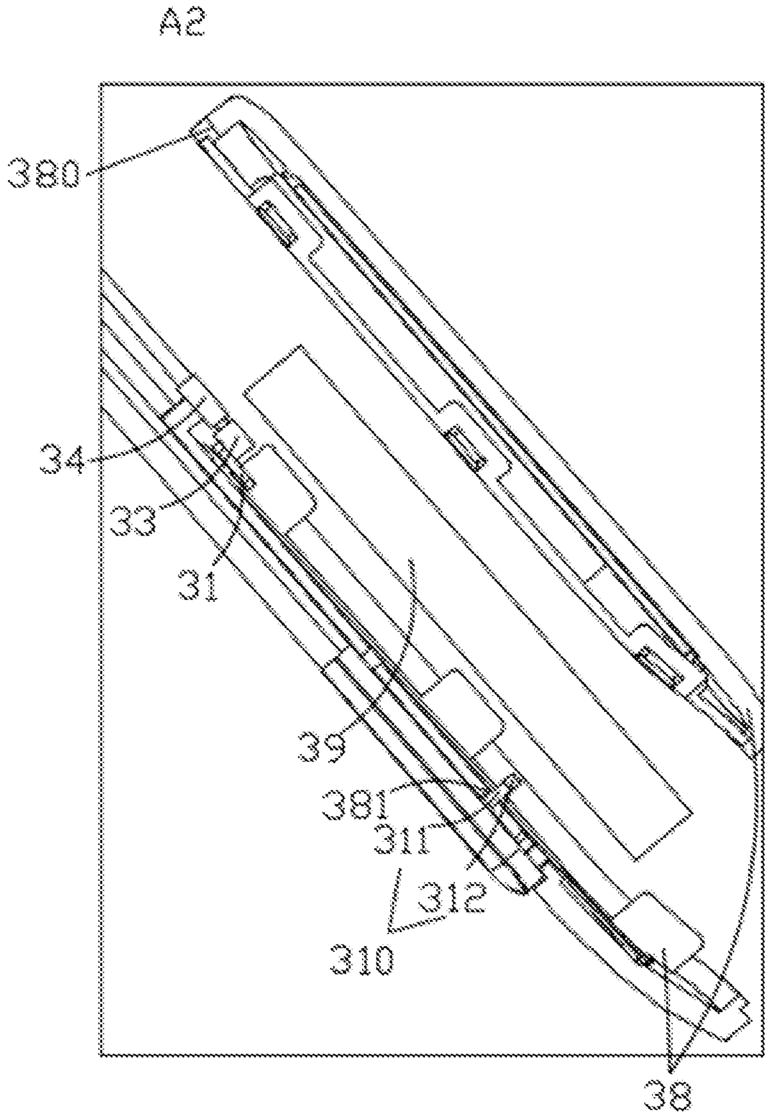
FIG. 12 is a schematic enlarged view of the portion A2 in FIG. 9.

As shown in FIG. 9 and FIG. 12, the neck-mounted portable power supply further includes two sets of mounting casings 38 respectively fixed at two ends of the neck-mounted member 30. Each of the power supply boards 31 is disposed in corresponding one set of mounting casings of the two sets of mounting casings 38 and fixed with the corresponding one set of mounting casings 38. The power supply interface 33 and the plug 34 may be respectively disposed on the power supply board 31 and the earphone charging cable 32. Each set of mounting casings are disposed with an opening 380 for exposing the power supply interface 33. The technical solution of this embodiment has advantages of stronger protection and more aesthetically pleasing products. Specifically, each set of mounting casings 38 provides a shield for the corresponding power supply board 31 to prevent the corresponding power supply board from directly exposed, which can not only effectively block external dusts and moisture, but also keep the power supply board 31 in a hidden state.

As shown in FIG. 9 and FIG. 12, the neck-mounted portable power supply further includes a battery 39 disposed in any one set of mounting casings of the two sets of mounting casings 38, and two sets of conductive wires 310 corresponding to the two power supply boards 31 in a one-to-one manner. For the two sets of conductive wires 310, one set of conductive wires of the two sets of conductive wires and the battery 39 are installed in the same one set of mounting casings 38, and the other one set of conductive wires of the two sets of conductive wires are embedded into the neck-mounted member 30.

Each set of conductive wires of the two sets of conductive wires 310 include a first conductive wire 311 conducting a positive electrode of the battery 39 with a positive electrode of the power supply board 31, and a second conductive wire 312 conducing a negative electrode of the battery 39 with a negative electrode of the power supply board 31. For example, each set of mounting casings of the two sets of mounting casings 38 are disposed with a wire-passing through slot 381 allowing the first conductive wire 311 and the second conductive wire 312 to pass through. The technical solution of this embodiment has the advantages of portability, compactness and better use experience. Specifically, only one battery 39 is required to supply power, and the overall product is lighter in weight. In addition, one set of conductive wires 310 are embedded into the neck-mounted member 30, which is neater and more beautiful, and the user will not be caught by the conductive wires when wearing or taking off the neck-mounted member 30.

As shown in FIG. 9 and FIG. 12, lower ends of the two sets of mounting casings 38 are arranged opposite to each other, the opening 380 is located at an upper end of the each set of mounting casings 38, which makes pulling and inserting of the earphone charging cable 32 more convenient.

Figure 10:
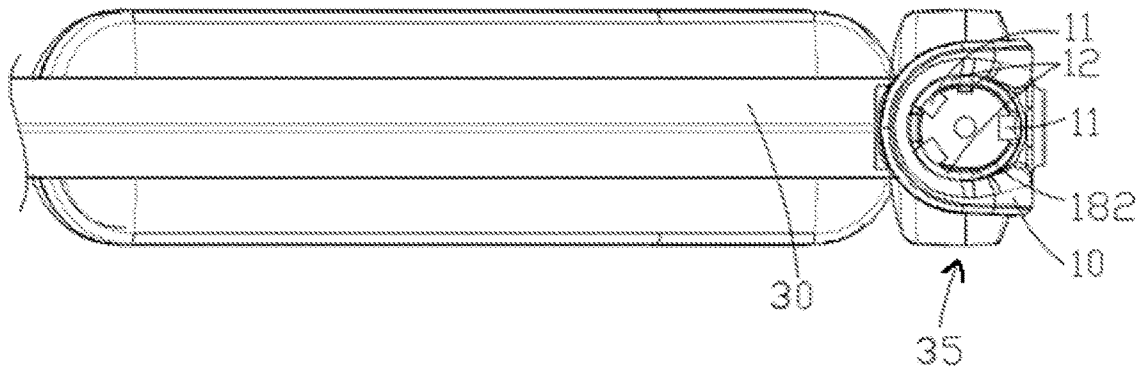
FIG. 10 is a schematic top view of the neck-mounted portable power supply with split-type earphone charging cables according to the fourth embodiment of the disclosure.
Figure 11:
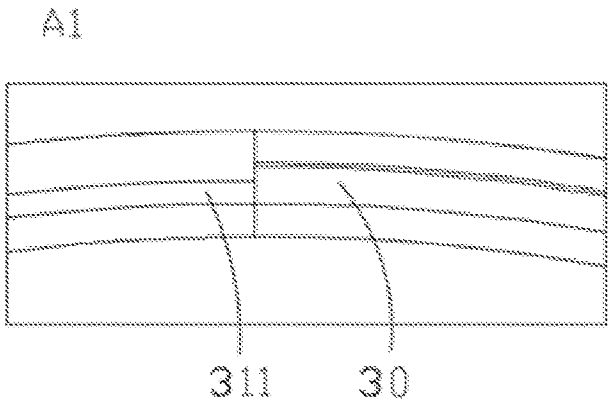
FIG. 11 is a schematic enlarged view of the portion A1 in FIG. 9.

As shown in FIG. 9 and FIG. 10, the earphone seat 10 of the earphone charger 35 may be disposed with an earphone insertion cavity 182. The charging resilient pieces 11 are located at a bottom of the earphone insertion cavity 182, and the earphone insertion cavity 182 corresponds to a flathead type BLUETOOTH earphone or a shallow-in BLUETOOTH earphone. The anti-disengagement component may include an elastic member, such as an annular elastic member, which is pressed by the BLUETOOTH earphone and fixedly disposed on a wall of the earphone insertion cavity 182. When in use, the BLUETOOTH earphone is inserted into the earphone charger 35, and the elastic member and the BLUETOOTH earphone are abutted against each other, so that the BLUETOOTH earphone can be quickly clamped on the earphone charger 35, and a good anti-disengagement effect is achieved; and when the BLUETOOTH earphone is further inserted, the BLUETOOTH earphone and the charging resilient pieces 11 are conducted, and the power charging can be performed. Among them, the elastic member may be an annular rubber strip (as shown in FIG. 10) or other elastic body.

In addition, it is worth noting that the earphone charger 35 may also be replaced with the earphone charger described in the first embodiment or the third embodiment.

The above description is only the illustrative embodiments of the disclosure, and is not intended to limit the scope of protection of the disclosure. On a premise of not departing from the spirit and scope of the disclosure, the disclosure may be subject to various changes and modifications. Any equivalent structural change made based on the description and the accompanying drawings of the disclosure under the inventive concept of the disclosure, or direct/indirect applications of the illustrated embodiments of the disclosure in other related technical fields should be included in the scope of protection of the disclosure.

What is claimed is:

1. An earphone charger, applied to a BLUETOOTH earphone, comprising:

an earphone seat, fixedly disposed with two charging resilient pieces and an anti-disengagement component;

wherein the two charging resilient pieces are configured to respectively abut against a positive electrode conductive strip and a negative electrode conductive strip on a charging end of the BLUETOOTH earphone, the two charging resilient pieces are obliquely arranged in a manner of approaching towards each other along an insertion direction of the BLUETOOTH earphone relative to the earphone seat, and thereby a distance between the two charging resilient pieces gradually decreases along the insertion direction; and wherein the anti-disengagement component is configured to prevent the BLUETOOTH earphone from disengaging from the two charging resilient pieces during charging;

wherein the earphone seat is further disposed with a resilient piece mounting block and a mounting groove configured to mount the resilient piece mounting block;

wherein the resilient piece mounting block is located on a side where the distance between the two charging resilient pieces is smaller, the resilient piece mounting block is fixed with the earphone seat, and the resilient piece mounting block is fixedly disposed with two fixing pieces corresponding to the two charging resilient pieces in a one-to-one manner; and wherein each of the two charging resilient pieces comprises a first end and a second end that are opposite to each other, each of the two fixing pieces is fixedly connected to the first end of a corresponding one of the two charging resilient pieces, and the second end is a free end;

wherein the earphone seat is fixedly disposed with limiting posts, and two sides of the resilient piece mounting block abut against the limiting posts to prevent the charging resilient pieces mounted on the resilient piece mounting block from side-shifting during the charging;

wherein the anti-disengagement component is disposed with limit grooves configured to accommodate the limiting posts respectively, and the limiting posts are engaged with the limit grooves to prevent the anti-disengagement component from shifting during the charging;

wherein the earphone seat is further fixedly disposed with an anti-shifting resilient piece configured to prevent the BLUETOOTH earphone from side-shifting during the charging, and the anti-shifting resilient piece and the two charging resilient pieces are triangularly distributed;

wherein the anti-disengagement component is further disposed with through grooves corresponding to the anti-shifting resilient piece and the two charging resilient pieces in a one-to-one manner, the through grooves are configured to allow the anti-shifting resilient piece and the two charging resilient pieces to pass through and expose the anti-shifting resilient piece and the two charging resilient pieces in a hollow area of the anti-disengagement component.

2. The earphone charger according to claim 1, wherein a first end of the earphone seat is fixedly disposed with the two charging resilient pieces, a second end opposite to the first end of the earphone seat is disposed with a wire-passing through slot, and the wire-passing through slot is configured to allow conductive wires to pass through and form electrical connections with the two charging resilient pieces.

3. The earphone charger according to claim 1, wherein the anti-disengagement component comprises an annular elastic member having the hollow area, the annular elastic member is fixed to the earphone seat and matched with the charging end of the BLUETOOTH earphone, and the two charging resilient pieces are exposed in the hollow area.

4. The earphone charger according to claim 1, wherein the earphone seat is disposed with an earphone insertion cavity configured to allow the charging end of the BLUETOOTH earphone to be inserted, a side wall of the earphone insertion cavity is disposed with two avoidance slots corresponding to the two charging resilient pieces in a one-to-one manner, and the free ends of the two charging resilient pieces facing towards an opening of the earphone insertion cavity correspond to the two avoidance slots respectively.

5. The earphone charger according to claim 4, wherein the anti-disengagement component comprises an annular elastic member configured to surround a periphery of the BLUETOOTH earphone during the charging, the annular elastic member is fixed to the earphone seat and is located on a side of the two charging resilient pieces facing towards the opening of the earphone insertion cavity.

6. A neck-mounted portable power supply, comprising: a neck-mounted member, two power supply boards respectively fixed at two opposite ends of the neck-mounted member, and two earphone charging cables corresponding to the two power supply boards in a one-to-one manner;

wherein one of the power supply board and the earphone charging cable paired therewith is fixedly disposed with a power supply interface at an end, and the other one of the power supply board and the earphone charging cable paired therewith is fixedly disposed with a plug corresponding to the power supply interface at an end;

wherein an end of each of the earphone charging cables facing away from the power supply board paired therewith is fixedly disposed with an earphone charger, and the two charging resilient pieces of the earphone charger are electrically connected to the earphone charging cable;

wherein the earphone charger, applied to a BLUETOOTH earphone, comprising:

an earphone seat, fixedly disposed with two charging resilient pieces and an anti-disengagement component; wherein the two charging resilient pieces are configured to respectively abut against a positive electrode conductive strip and a negative electrode conductive strip on a charging end of the BLUETOOTH earphone, the two charging resilient pieces are obliquely arranged in a manner of approaching towards each other along an insertion direction of the BLUETOOTH earphone relative to the earphone seat, and thereby a distance between the two charging resilient pieces gradually decreases along the insertion direction; and the anti-disengagement component is configured to prevent the BLUETOOTH earphone from disengaging from the two charging resilient pieces during charging.

7. The neck-mounted portable power supply according to claim 6, further comprising: two sets of mounting casings respectively fixed at the two opposite ends of the neck-mounted member;

wherein each of the power supply boards is disposed in corresponding one set of mounting casings of the two sets of mounting casings and fixed with the corresponding one set of mounting casings, the power supply interface and the plug are respectively disposed on the power supply board and the earphone charging cable, and each set of mounting casings are disposed with an opening configured to expose the power supply interface.

8. The neck-mounted portable power supply according to claim 7, further comprising: a battery disposed in any one set of mounting casings of the two sets of mounting casings, and two sets of conductive wires corresponding to the two power supply boards in a one-to-one manner;

wherein one set of conductive wires of the two sets of conductive wires and the battery are disposed in same one set of mounting casings, and the other one set of conductive wires of the two sets of conductive wires are embedded into the neck-mounted member;

wherein each set of conductive wires of the two sets of conductive wires comprise a first conductive wire conducting a positive electrode of the battery with a positive electrode of the power supply board, and a second conductive wire conducting a negative electrode of the battery with a negative electrode of the power supply board; and wherein each set of mounting casings of the two sets of mounting casings are disposed with a wire-passing through slot allowing the first conductive wire and the second conductive wire to pass through.

9. The neck-mounted portable power supply according to claim 7, wherein lower ends of the two sets of mounting casings are arranged opposite to each other, and the opening is located at an upper end of the each set of mounting casings.

10. An earphone charger, comprising:

an earphone seat, disposed with a resilient piece mounting block, a first charging resilient piece, a second charging resilient piece, an anti-shifting resilient piece, a mounting groove, and an annular elastic member;

wherein the first charging resilient piece and the second charging resilient piece are configured to respectively abut against a positive electrode conductive strip and a negative electrode conductive strip on a charging end of a BLUETOOTH earphone to charge the BLUETOOTH earphone, the first charging resilient piece and the second charging resilient piece are fixed on the resilient piece mounting block and spaced from each other, and the first charging resilient piece and the second charging resilient piece are obliquely arranged in a manner of approaching towards each other along an insertion direction of the BLUETOOTH earphone relative to the earphone seat;

wherein the anti-shifting resilient piece is configured to prevent the BLUETOOTH earphone from side-shifting during charging, and the anti-shifting resilient piece is fixed on the resilient piece mounting block and is located on a same side of the resilient piece mounting block as the first charging resilient piece and the second charging resilient piece;

wherein the resilient piece mounting block is installed in the mounting groove; and wherein the annular elastic member is fixed to the earphone seat and configured to allow the BLUETOOTH earphone to be extended therein to thereby make the positive electrode conductive strip and the negative electrode conductive strip on the charging end respectively abut against the first charging resilient piece and the second charging resilient piece for the charging, and the annular elastic member is further configured to prevent the BLUETOOTH earphone from disengaging from the first charging resilient piece and the second charging resilient piece during the charging.

11. The earphone charger according to claim 10, wherein the resilient piece mounting block is disposed with fixing pieces corresponding to the first charging resilient piece and the second charging resilient piece in a one-to-one manner; each of the first charging resilient piece and the second charging resilient piece comprises a first end and a second end that are opposite to each other, the first end is fixedly connected to a corresponding one of the fixing pieces, and the second end is a free end.

12. The earphone charger according to claim 11, wherein the second end is closer to the resilient piece mounting block than the first end.

13. The earphone charger according to claim 10, wherein the anti-shifting resilient piece, the first charging resilient piece and the second charging resilient piece are spaced apart from each other and triangularly arranged.

14. The earphone charger according to claim 10, wherein the annular elastic member comprises a hollow rubber sleeve or an annular rubber strip.

15. The earphone charger according to claim 10, wherein the earphone seat is disposed with an earphone insertion cavity configured to allow the charging end of the BLUETOOTH earphone to be inserted, a side wall of the earphone insertion cavity is disposed with avoidance slots corresponding to the first charging resilient piece and the second charging resilient piece in a one-to-one manner, and the free ends of the first charging resilient piece and the second charging resilient piece facing towards an opening of the earphone insertion cavity correspond to the avoidance slots respectively.

* * * * *